(12) United States Patent
Wu

(10) Patent No.: US 11,393,232 B2
(45) Date of Patent: Jul. 19, 2022

(54) EXTRACTING VALUES FROM IMAGES OF DOCUMENTS

(71) Applicant: LendingClub Bank, National Association, Lehi, UT (US)

(72) Inventor: Yifan Wu, San Francisco, CA (US)

(73) Assignee: LendingClub Bank, National Association, Lehi, UT (US)

( * ) Notice: Subject to any disclaimer, the term of this patent is extended or adjusted under 35 U.S.C. 154(b) by 183 days.

(21) Appl. No.: 16/729,291

(22) Filed: Dec. 27, 2019

(65) Prior Publication Data

US 2021/0201014 A1 Jul. 1, 2021

(51) Int. Cl.
*G06K 9/34* (2006.01)
*G06V 30/412* (2022.01)
*G06T 7/00* (2017.01)

(52) U.S. Cl.
CPC .......... *G06V 30/412* (2022.01); *G06T 7/0004* (2013.01); *G06T 2207/20081* (2013.01); *G06T 2207/20084* (2013.01); *G06T 2207/30176* (2013.01)

(58) Field of Classification Search
CPC .. G06K 9/00449; G06K 9/627; G06K 9/6227; G06T 7/0004; G06T 2207/20084; G06T 2207/20081; G06T 2207/30176; G06V 30/412
See application file for complete search history.

(56) References Cited

U.S. PATENT DOCUMENTS

| 9,516,053 | B1* | 12/2016 | Muddu | H04L 63/1433 |
| 10,867,171 | B1* | 12/2020 | Contryman | G06K 9/00463 |
| 2013/0064861 | A1* | 3/2013 | Schwartz | A61L 27/38 |
| | | | | 424/400 |
| 2015/0142418 | A1* | 5/2015 | Byron | G06F 40/232 |
| | | | | 704/9 |
| 2017/0351913 | A1* | 12/2017 | Chen | G06K 9/00442 |
| 2019/0361864 | A1* | 11/2019 | Rice | G06F 16/23 |
| 2020/0117944 | A1* | 4/2020 | Duta | G06F 16/355 |

(Continued)

OTHER PUBLICATIONS

Palm, Ramus et al., "CloudScan—A configuration-free invoice analysis system using recurrent neural networks" 2017 14th IAPR International Conference on Document Analysis and Recognition (ICDAR) (vol. 1, pp. 406-413, IEEE.*

(Continued)

*Primary Examiner* — Samir A Ahmed
(74) *Attorney, Agent, or Firm* — Hickman Becker Bingham Ledesma LLP

(57) ABSTRACT

Techniques are described for extracting key values from a document without having to rely on finding corresponding labels for the target keys within the extracted text of the document. Further the techniques do not rely on knowledge of the correlation between (a) the location of labels within a document, and (b) the location of the key values that correspond to the labels. Key values are extracted from a document by, identifying candidate values within the document, establishing "joint-candidate" sets from those candidate values, and using a trained machine learning mechanism to score each joint-candidate set of values. The highest scoring joint-candidate set is deemed to reflect the correct mapping of candidate values to target keys for the document.

20 Claims, 5 Drawing Sheets

(56) References Cited

U.S. PATENT DOCUMENTS

2020/0160050 A1* 5/2020 Bhotika ............. G06K 9/00449
2021/0064861 A1* 3/2021 Semenov ............. G06F 40/183

OTHER PUBLICATIONS

Holt, Xavier et al., "Extracting structured data from invoices", Proceedings of the Australasian Language Technology Association Workshop 2018, Dunedin, New Zealand, ALTA 2018, Dec. 10-12, 2018, pp. 53-59.*
Freitag, Dayne, "Information Extraction from HTML: Application of a General Machine Learning Approach", American Association for Articial Intelligence (AAAI) Proceedings, 1998.*
Zheng,Shuai et al., "Effective Information Extraction Framework for Heterogeneous Clinical Reports Using Online Machine Learning and Controlled Vocabularies", JMIR Medical Informatics 2017 | vol. 5 | iss. 2 | e12 | pp. 1-11.*
Hu, Yunhua et al., Automatic Extraction of Titles from General Documents using Machine Learning, JCDL'05, Jun. 7-11, 2005, Denver, Colorado, USA.*
Claire Nédellec," Machine learning for information extraction in genomics: state of the art and perspectives", International workshop on text mining and its application, Apr. 2003, Patras, Greece.hal-02764351.*

* cited by examiner

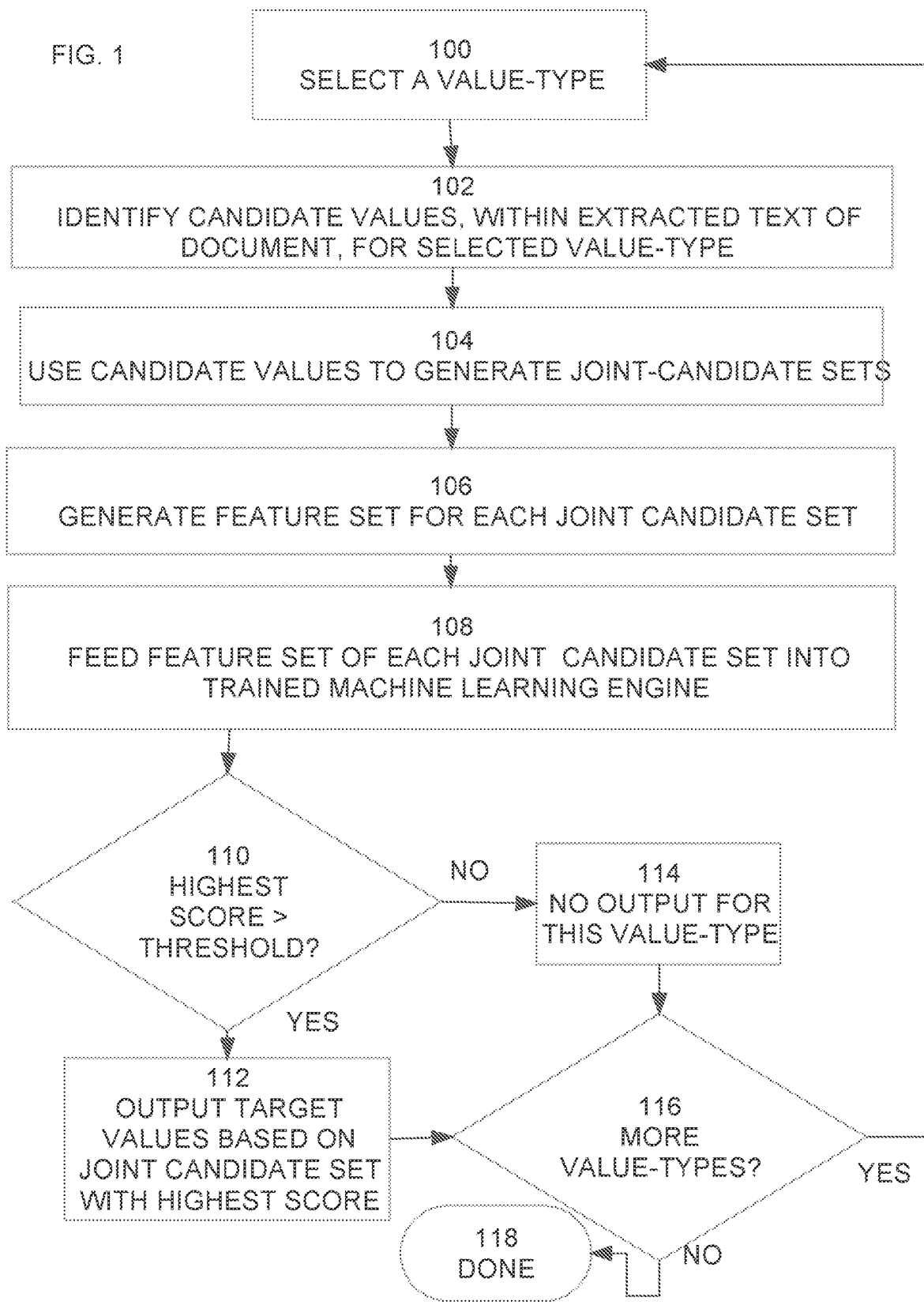

| JOINT-CANDIDATE SET | START DATE | END DATE | PAY DATE |
|---|---|---|---|
| 1 | DATE1 | DATE2 | DATE3 |
| 2 | DATE1 | DATE2 | DATE4 |
| 3 | DATE1 | DATE3 | DATE2 |
| 4 | DATE1 | DATE3 | DATE4 |
| 5 | DATE1 | DATE4 | DATE2 |
| 6 | DATE1 | DATE4 | DATE3 |
| 7 | DATE2 | DATE1 | DATE3 |
| 8 | DATE2 | DATE1 | DATE4 |
| 9 | DATE2 | DATE3 | DATE1 |
| 10 | DATE2 | DATE3 | DATE4 |
| 11 | DATE2 | DATE4 | DATE1 |
| 12 | DATE2 | DATE4 | DATE3 |
| 13 | DATE3 | DATE2 | DATE1 |
| 14 | DATE3 | DATE2 | DATE4 |
| 15 | DATE3 | DATE1 | DATE2 |
| 16 | DATE3 | DATE1 | DATE4 |
| 17 | DATE3 | DATE4 | DATE2 |
| 18 | DATE3 | DATE4 | DATE1 |
| 19 | DATE4 | DATE2 | DATE3 |
| 20 | DATE4 | DATE2 | DATE1 |
| 21 | DATE4 | DATE3 | DATE2 |
| 22 | DATE4 | DATE3 | DATE1 |
| 23 | DATE4 | DATE1 | DATE2 |
| 24 | DATE4 | DATE1 | DATE3 |

FIG. 2

| JOINT-CANDIDATE SET | START DATE | END DATE | PAY DATE |
| --- | --- | --- | --- |
| 1 | January 4, 2012 | January 1, 2012 | 1/15/12 |
| 2 | January 4, 2012 | January 1, 2012 | 1/31/2012 |
| 3 | January 4, 2012 | 1/15/12 | January 1, 2012 |
| 4 | January 4, 2012 | 1/15/12 | 1/31/2012 |
| 5 | January 4, 2012 | 1/31/2012 | January 1, 2012 |
| 6 | January 4, 2012 | 1/31/2012 | 1/15/12 |
| 7 | January 1, 2012 | January 4, 2012 | 1/15/12 |
| 8 | January 1, 2012 | January 4, 2012 | 1/31/2012 |
| 9 | January 1, 2012 | 1/15/12 | January 4, 2012 |
| 10 | January 1, 2012 | 1/15/12 | 1/31/2012 |
| 11 | January 1, 2012 | 1/31/2012 | January 4, 2012 |
| 12 | January 1, 2012 | 1/31/2012 | 1/15/12 |
| 13 | 1/15/12 | January 1, 2012 | January 4, 2012 |
| 14 | 1/15/12 | January 1, 2012 | 1/31/2012 |
| 15 | 1/15/12 | January 4, 2012 | January 1, 2012 |
| 16 | 1/15/12 | January 4, 2012 | 1/31/2012 |
| 17 | 1/15/12 | 1/31/2012 | January 1, 2012 |
| 18 | 1/15/12 | 1/31/2012 | January 4, 2012 |
| 19 | 1/31/2012 | January 1, 2012 | 1/15/12 |
| 20 | 1/31/2012 | January 1, 2012 | January 4, 2012 |
| 21 | 1/31/2012 | 1/15/12 | January 1, 2012 |
| 22 | 1/31/2012 | 1/15/12 | January 4, 2012 |
| 23 | 1/31/2012 | January 4, 2012 | January 1, 2012 |
| 24 | 1/31/2012 | January 4, 2012 | 1/15/12 |

FIG. 3

| JOINT-CANDIDATE SET | START DATE | END DATE | PAY DATE |
| --- | --- | --- | --- |
| 4 | January 4, 2012 | 1/15/12 | 1/31/2012 |
| 7 | January 1, 2012 | January 4, 2012 | 1/15/12 |
| 8 | January 1, 2012 | January 4, 2012 | 1/31/2012 |
| 10 | January 1, 2012 | 1/15/12 | 1/31/2012 |

FIG. 4

EXTRACTING VALUES FROM IMAGES OF DOCUMENTS

FIELD OF THE INVENTION

The present invention relates to automated information extraction and, more specifically, to techniques for automatically extracting values from images of documents.

BACKGROUND

It is common for information contained in a document provided by one entity to be needed as input to software of another entity. For example, information provided on a paystub (provided by an employer) may be needed by the software of an employee (e.g. a budgeting tool). Paystubs are merely one example of physical structured or semi-structured documents that may have information needed as input to a software application. Other documents that may include needed information may include, but are not limited to, birth certificates, vehicle registration cards, marriage certificates, titles, etc. The techniques described herein are not limited to any particular type of document.

One way to transfer the information ("key values") from a document into the software that needs the key values is for the user to manually enter the key values into the software. For example, assume that the employee's budgeting tool requires the following information from each paystub:
start_date (of the pay period covered by paystub)
end_date (of the pay period covered by the paystub)
pay_date
payment_amount An employee may read this information off each paystub and manually type the information into an interface provided by the budgeting tool used by the employee. However, transferring information manually in this fashion can become tedious and error prone. Consequently, techniques have been developed for automatically extracting from documents the key values required by software.

Many techniques for automatically extracting key values from a document involve (a) obtaining a digital image of the document, (b) performing Optical Character Recognition (OCR) on the document to extract the text of the document, and (c) within the extracted text, searching for key/value pairs that match certain patterns. For example, to find the value for the start_date of the time period covered by a paystub, the extracted text of the paystub may be searched for a date value that follows the label "Start Date:".

Unfortunately, such "key/value pattern matching" techniques can yield inaccurate results for a variety of reasons. For example, different sources may use different labels for the same target key. Thus, the "start_date" of a payment period may be specified by the label "Start Date:" on the paystub from one employer, and by the label "Beginning Date:" on the paystub of another employer. In fact, the "start_date" key value may be preceded by any one of dozens of possible labels (e.g. "S. Date", "Starting date", "Start Date", "B. Date", "Beg. Date", etc.) To complicate the situation further, different paystubs (and the labels contained therein) may even be in different languages. In some situations, the key "start_date" may not even have its own label. For example, a paystub may simply say "period covered:" followed by both the start_date and end_date values.

Another problem with key/value pattern matching techniques is that, on the source document, the value that corresponds to a key may not immediately follow the label for the key. For example, if the information on a paystub is arranged in vertical columns, the labels "Start Date" and "End Date" may be printed above the actual start and end date values. Consequently, in the extracted text, the sequence may be: start-date-label, end-date-label, unrelated text, start-date-value, end-date-value. When the correlation between the location of labels and the location of their corresponding values is not well defined, such as in this example, the accuracy of key/value pattern matching is further reduced.

When the relationship between the label of a target key and the value of the target key are known (e.g. it is known that the start date value immediately follows the label "Start Date:"), key/value pattern matching can be accurate. However, that accuracy only persists while the template of the underlying document remains unchanged. If that template were to change (e.g. the start date value is changed to the line below the "Start Date" label), then the same key/value patterns would cease to find the values for the desired key values.

Based on the foregoing, it is desirable to provide a technique for extracting key values from a document without having to rely on finding corresponding labels for the target keys within the extracted text of the document. It is further desirable to provide a technique for extracting key values from a document in a manner that does not rely on knowledge of the correlation between (a) the location of labels within a document, and (b) the location of the key values that correspond to the labels.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 is a flowchart illustrating steps for extracting key values from images of documents, according to an embodiment;

FIG. 2 is an example of joint-candidate sets that are generated when four values encountered in a document have the value-type of three key values, according to an embodiment;

FIG. 3 is a table showing an example of 24 joint-candidate sets;

FIG. 4 is a table showing joint-candidate sets of FIG. 3 that remain after filtering the joint-candidate sets based on heuristics.

DETAILED DESCRIPTION

Figure 5:
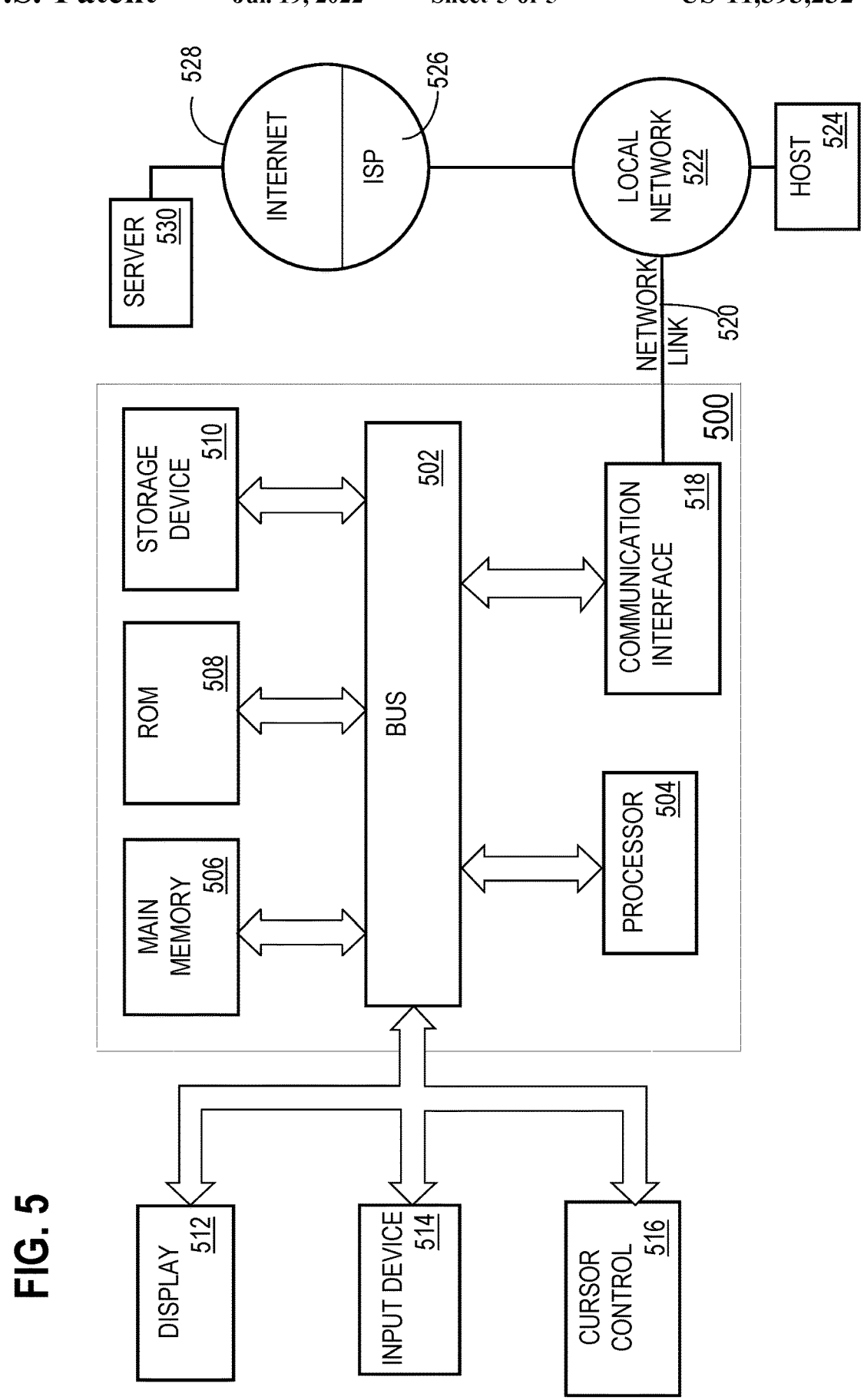
FIG. 5 is a block diagram of a computer system upon which embodiments of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for extracting key values from a document without having to rely on finding corresponding labels for the target keys within the extracted text of the document. Further the techniques described herein do not rely on knowledge of the correlation between (a) the location of labels within a document, and (b) the location of the key values that correspond to the labels.

According to an embodiment, key values are extracted from a document by:
- identifying candidate values within the document
- establishing "joint-candidate" sets from those candidate values
- using a trained machine learning mechanism to score each joint-candidate set of values The highest scoring joint-candidate set is deemed to reflect the correct mapping of candidate values to target keys for the document.

According to one embodiment, the machine learning mechanism is trained based on features of the joint-candidate sets. The features of a candidate set of values may include vertical features (which relate to how a candidate value in a candidate set relates to corresponding candidate values in other candidate sets), and horizontal features (which relate to how candidate values in a candidate set relate to each other).

There is no limit to the type of documents upon which the target key value extraction techniques described herein may be performed. As a general rule, the more uniform the structure of a document type, the more accurate target vale extraction will be from documents of that document type. As non-limiting examples, structured documents from which key values may be extracted using the techniques described herein include paystubs, title documents, birth certificates, vehicle registrations, business licenses, diplomas, certifications, etc.

Overview of Phases

According to an embodiment, key value extraction is performed in a series of phases, where the series of phases is performed separately for each value-type. For example, assume that the source document is a paystub, and that the key values to be extracted include values for the following target keys:
- start_date
- end_date
- pay_date
- gross_pay_amount
- taxes_withheld_amount
- net_pay_amount In this example, three target keys (start_date, end_date, pay_date) are of the value-type "date", and three target keys (gross_pay_amount, taxes_withheld_amount, net_pay_amount) are of the value-type "dollar-amount". Consequently, the series of phases shall be executed twice: once to attempt to extract key values for the target keys that are dates, and again to attempt to extract key values for the target keys that are dollar-amounts.

The phases are illustrated in the flowchart depicted in FIG. 1. Referring to FIG. 1, at step 100, a value-type for which key values are to be extracted is selected. For the purpose of illustration, it shall be assumed that the value-type "date" is initially selected.

At step 102, the values in the text of the document that match the selected value-type are identified. Those values are referred to herein as "candidate values". In the present example, the extraction is for the value-type "date", so step 102 would involve identifying all of the dates in the text of the paystub in question.

At step 104, a plurality of "joint-candidate sets" are generated using the candidate values that were identified in step 102. Each joint-candidate set represents a possible candidate-value-to-target-key mapping. For example, assume that, during step 102, four dates (date1, date2, date3, date4) are identified within the extracted text of a scanned document. The table illustrated in FIG. 2 shows the 24 possible mappings between those four dates (date1, date2, date3, date4) and the three date-type target keys (start_date, end_date, pay_date).

At step 106, feature sets are generated for each joint-candidate set identified in step 104. According to one embodiment, the feature sets that are generated for each joint-candidate set include both vertical features and horizontal features. However, alternative embodiments may include only vertical features, or only horizontal features. The generation of feature sets shall be described in greater detail hereafter.

At step 108, the feature sets of the joint-candidate sets are fed to a trained machine learning engine to generate a confidence score for each joint-candidate set. At step 110, the highest confidence score produced in step 108 is compared to a threshold score. If the highest confidence score is above the threshold score, then control passes to step 112 and the joint-candidate set whose feature set produced that highest confidence score is used to output the key values. For example, if the feature set of joint-candidate-set 6 (in FIG. 2) produces the highest score, and that score is higher than the threshold score, then the date1 is output as the start_date, date4 is output as the end_date, and date3 is output as the pay_date. Otherwise, at step 114, no key values are output.

At step 116, it is determined whether there are more value-types to process. In the present example, the target keys included date values and dollar-amount values. Consequently, after extracting the date values, control would pass from step 116 back to step 100 to extract the dollar-amount key values. After extracting the dollar-amount key values, control would pass to step 118 and the process of extracting key values from the document in question would be done.

Identifying Candidate Values within the Extracted Text

As mentioned above, step 102 of FIG. 1 involves identifying candidate values, within extracted text of a document, for a selected value-type. Typically, prior to performing step 102, a digital image is created by scanning and/or taking a photo of a physical document, and the "extracted text" is generated by performing Optical Character Recognition (OCR) on that digital image. However, the techniques described herein are not limited to any particular way of generating the extracted text of a document.

Once the extracted text of a document has been generated, candidate values within the extracted text are identified for the value-type in question. According to one embodiment, a string within the extracted text qualifies as a candidate value of a value-type if the string conforms to a format/pattern associated with the value-type. For example, assume that the value-type in question is "dates". Strings within the extracted text qualify as candidate values for dates if they confirm to any of the conventional date formats. The following values reflect several possible date formats:

Jan. 4, 2012
Jan. 4, 2012
1/4/2012
01/04/2012
1/4/12
4 Jan. 2012
4 January 2012
January 4th, 2012

These are merely examples, and do not represent all possible data formats. Rather, the examples show how a single value-type may correspond to many patterns/formats.

The candidate identification process for the value-type "date" may involve searching the extracted data for strings that match any of those formats. For the purpose of illustration, it shall be assumed that the candidate identification process for the value-type "date" found the following four date values within the extracted text of a particular pay-stub: Jan. 4, 2012, Jan. 1, 2012, 1/15/12, and 1/31/2012.

In some cases, the number of candidate values that are identified in step 102 will exceed the number of target keys for the value-type in question. In the present example, four dates were identified in step 102, even though the system is attempting to extract values for only three date-type keys (start_date, pay_date, end_date).

It is also possible that the number of extracted date-type candidate values is less than the number of date-type target keys. In such situations, the process may proceed as described below, but the final key value determination will not have a value for at least one of the target keys.

Pruning the Formats of a Value-Type

As mentioned above, the candidate value identification process for a given value-type may involve looking for strings that match any one of a large number of formats/patterns. The number of formats/patterns may proliferate, for example, if the documents may be from different countries and/or in different languages. Consequently, identifying candidate strings that match any format of a value-type that has a high number of formats may not be optimal.

For example, assume that there are 100 date formats, but the document in question only uses 2 date formats. Under these circumstances, any strings that match any of the 98 other date formats are not really date values. Unless the total set of formats of a value-type is "pruned" to include only those formats that are likely to be in the document, the identified candidate values can include a lot of "noise".

According to one embodiment, the set of available formats for a value-type may be pruned based on scores generated for each format. For example, consider the following date formats:

Format 1: MM/DD/YYYY (e.g. 12/15/1963).
Format 2: DD Month YYYY (e.g. 15 Dec. 1963).
Format 3: Month DD, YYYY (e.g. Dec. 15, 1963)

According to one embodiment, scores may be assigned to each of these formats by the formula:

format_score=quality extractions/total extractions

In this formula, "total extractions" refers to the total number of values, identified in the extracted text of documents, that match the format. "Quality extractions", on the other hand, is the number of those extractions that produce confidence scores higher than some threshold.

Such confidence scores may be produced, for example, by a machine learning engine trained to predict the likelihood that a string is actually a date. For example, Format 1 may identify 10 strings as dates, and the machine learning engine may indicate that all 10 of those strings are probably dates. Under these circumstances, the Format 1 may be assigned the score of 1.

Format 2 may identify 20 strings as dates, and the machine learning engine may indicate that 12 of those strings are probably dates. Under these circumstances, the Format 1 may be assigned the score of 0.6.

Format 3 may identify 20 strings as dates, and the machine learning engine may indicate that 2 of those strings are probably dates. Under these circumstances, the Format 1 may be assigned the score of 0.1.

If the threshold score for using a format is 0.5, Formats 1 and 2 pass the format-pruning test, while Format 3 does not. The values that were identified by a format that does not pass the format-pruning test are not used when generating joint-candidate sets. Thus, in the present example, the candidate date values produced by Formats 1 and 2 would be used to create joint-candidate sets in step 104, and the candidate date values produced for Format 3 would not be used.

Generating the Joint-Candidate Sets

After step 102, where date-type candidate values are identified, joint-candidate sets are generated based on those candidate values. Each joint-candidate set represents a distinct mapping of (a) the identified candidate values for a particular value-type to (b) the target keys for that particular value-type. In the present example, each joint-candidate set represents a distinct mapping of the four identified dates (Jan. 4, 2012, Jan. 1, 2012, 1/15/12, and 1/31/2012) to the three target date-type keys (start_date, end_date, pay_date). FIG. 3 is a table showing the 24 joint-candidate sets generated under these circumstances.

Pruning the Joint-Candidate Sets Based on Heuristics

According to one embodiment, heuristics may be applied to automatically disqualify some of the joint-candidate sets prior to proceeding to step 106 (where feature sets are generated for each joint-candidate set). For example, since the "end_date" of a period necessarily occurs after the "start_date" of the same period, it is possible to eliminate the joint-candidate sets that map to the end_date key a date value that is earlier than the date value that is mapped to the start_date key. Similarly, if it is known that the pay_date is no earlier than the end_date, it is possible to eliminate the joint-candidate sets that map to the pay_date key a date value that is earlier than the date value that is mapped to the end_date key. FIG. 4 illustrates that joint-candidate sets that remain after applying these two rules to the joint-candidate sets of FIG. 3.

After the joint-candidate sets for a particular value-type have been generated (and optionally filtered based on heuristics), feature sets are generated for each of the remaining joint-candidate sets, as shall be explained in greater detail below.

Generating the Feature Set of a Joint-Candidate Set

A "feature set" of a joint-candidate set provides information about the joint-candidate set that is used by a machine-learning engine to generate a score for the joint-candidate set that reflects the likelihood that the joint-candidate set is accurate. In the present example, a join-candidate set is accurate if the joint-candidate set maps the correct date values to the target date values. For example, if the period covered by the scanned pay-stub was Jan. 1, 2012 to Jan. 15, 2012 and the pay date was Jan. 31, 2012, then joint-candidate set 10 (FIG. 4) would be accurate.

The feature set generated for a joint-candidate set may include horizontal features and vertical features. Horizontal features relate to how values within the joint-candidate set relate to each other. For example, horizontal features of the joint-candidate sets for the date values may be:
HFeature1: days_between(start_date, end_date).
HFeature2: days_between(end_date, pay_date).

The values for HFeature1 for the joint-candidate sets 4, 7, 8 and 10 (in FIG. 4) would be 11, 3, 3, and 14, respectively. The values for HFeature2 for the joint-candidate sets 4, 7, 8 and 10 would be 16, 11, 27, and 16, respectively.

Vertical features relate to how values in a joint-candidate set relate to corresponding values in other joint-candidate sets. For example, vertical features of the joint-candidate sets for date values may be:
VFeature1: start_date_rank
VFeature2: end_date_rank
VFeature3: start_date_rank The "start_date rank" refers to the position of the joint-candidate set if the joint-candidate sets were ordered based on start_date value. In the present case, the values for VFeature1 for the joint-candidate sets 4, 7, 8 and 10 would be 4, 1, 1, 1, respectively, because joint-candidate set 4 has a start_date value that is later than the start_date value of the other three joint-candidate sets, and the start_date values of the other three joint-candidate sets are "tied" for earliest.

Similarly, the values for VFeature2 for the joint-candidate sets 4, 7, 8 and 10 would be 3, 1, 1, 3, respectively. the values for VFeature3 for the joint-candidate sets 4, 7, 8 and 10 would be 2, 1, 2, 2, respectively.

These are merely examples of the types of features that may be computed for each joint-candidate set during step 106. The techniques described herein are not limited to any particular features. The specific features that best reflect the likelihood that the mapping indicated by the joint-candidate set is accurate will vary from implementation to implementation. Thus, in the present example, HFeature1 (the days between start date and end date) may be significantly more indicative of whether a joint-candidate set is accurate than, for example, the VFeature2 (the rank of the end_date relative to other end_dates).

Using a Trained Machine Learning Engine to Score Each Joint-Candidate Set

Once a feature set has been generated for each candidate set, the feature set is fed to a trained machine learning engine. Based on the feature set that corresponds to a joint-candidate set, the trained machine learning engine generates a score that indicates the likelihood that the candidate-values-to-target-keys mapping represented by the joint-candidate set is accurate.

According to one embodiment, generating scores for the joint-candidate sets involves using a discriminative model to update the confidence score for all joint-candidate sets. After updating the confidence scores, a confidence threshold is applied to filter out candidate sets with low confidence. The candidate set with the highest confidence score (should be higher than the threshold) will be the model's output. If no candidate set has higher than threshold confidence score, no output will be given.

For example, when fed to a trained machine learning engine, the feature sets of joint-candidate sets 4, 5, 8 and 10 (shown in FIG. 4) may produce the scores 0.4, 0.5, 0.3 and 0.9, respectively. In this example, the feature set of joint-candidate set 10 produces the highest score, so the mapping reflected by joint-candidate set 10 is automatically determined to be the correct mapping. Consequently, it would be determined that the paystub in question was for the pay period of Jan. 1, 2012 to Jan. 15, 2012, and had a pay date of Jan. 31, 2012.

As mentioned above (step 112 in FIG. 1), the highest confidence score may be tested before the corresponding joint-candidate set is determined to be correct. For example, the highest confidence score may be compared to a threshold. According to one embodiment, if the highest confidence score is below the threshold, then the corresponding candidate set is not determined to be correct. Instead, the key value extraction system may simply output an alert that indicates that the key values could not be determined automatically. Under these circumstances, a human may have to manually inspect the document to determine the key values.

Training a Machine Learning Engine to Score Joint-Candidate Sets

Training a machine learning engine to score joint-candidate sets largely involves the same steps as using the machine learning engine to score joint-candidate sets. Specifically, the values, within the extracted-text of a document, that match a particular value-type are identified. From those values, a set of joint-candidate sets are created. Feature sets are generated for the joint-candidate set. However, for training purposes, the machine learning engine is not only fed the features of each joint-candidate set, but is also fed an indication of whether the joint-candidate set represents the correct mapping of values to target keys. For example, assuming that, for a particular paystub, the correct mapping is:
start_date=1/1/2012
end_date=1/15/2012
pay_date=1/31/2012

Under these circumstances, the features of the joint-candidate set that reflects this value-to-key mapping (i.e. joint-candidate set 10 in FIG. 4) would be fed to the machine learning engine with an indication that it is feature set of the correct answer, while the feature sets of all other joint-candidate sets would be fed to the machine learning engine with an indication that those are the feature sets of the wrong answer. This process is repeated for all paystub in the training set, causing the machine learning engine to create a model based on which feature sets were associated with "correct" results and which were associated with "incorrect" results. The model thus created can then be used to generate scores that reflect the likelihood that any given feature set represents the correct mapping between candidate values and target keys.

According to one embodiment, rather than train a single model, multiple models are trained. Each of the models may be based on a different modelling technique. For example, the models may include a linear regression model, non-linear model, and a neural network model. Once the various models are trained, the results of the models may be compared to select the best-performing model to use in any given extraction operation. In one embodiment, to judge the performance of different models, a weighted metric is used, where the weighted metric is a combination of the following two metrics:

Extraction Rate $$\frac{\text{Total number of fields that are extracted by the model}}{\text{Total number of fields}}$$

Extraction Accuracy $$\frac{\text{Total number of fields that}}{\text{Total number of fields that are extracted by the model}}$$

The weight assigned to each of the constituent metrics that form the composite model metric may vary from implementation to implementation based on the business case.

A model trained in the manner described herein achieves significantly better results in both metrics compared to other solutions. The techniques described herein automate the document review process and other processes that rely on document information, which will lead to saving in operation cost. In particular, a model trained in this manner minimizes the required pre-knowledge and helps generalize the modeling process for different types of information extraction tasks. In addition, the automated extraction technique described herein allows for more efficient development and better performance monitoring.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining extracted text from a document;
   identifying a plurality of candidate values, within the extracted text, that correspond to a particular value-type;
   generating a plurality of candidate sets based on the plurality of candidate values, wherein each candidate set of the plurality of candidate sets represents a distinct mapping of candidate values, from the plurality of candidate values, to a set of two or more target keys of the particular value-type;
   generating a respective feature set for each candidate set of the plurality of candidate sets;
   generating a plurality of scores, where each score is for an entire candidate set, by feeding the respective feature set of two or more candidate sets, of the plurality of candidate sets, to a trained machine learning engine to generate a respective score for each of the two or more candidate sets;
   based on the plurality of scores, selecting a particular candidate set of the plurality of candidate sets; and
   generating output that indicates the mapping, of candidate values to the set of target keys, that is represented by the particular candidate set;
   wherein the method is performed by one or more computing devices.

2. The method of claim 1 wherein identifying a plurality of candidate values includes identifying values, within the extracted text, that match any one of a plurality of formats associated with the particular value-type.

3. A method comprising:
obtaining extracted text from a document;
identifying a plurality of candidate values, within the extracted text, that correspond to a particular value-type;
generating a plurality of candidate sets based on the plurality of candidate values, wherein each candidate set of the plurality of candidate sets represents a distinct mapping of candidate values, from the plurality of candidate values, to a set of target keys of the particular value-type;
generating a respective feature set for each candidate set of the plurality of candidate sets;
generating a plurality of scores, where each score is for an entire candidate set, by feeding the respective feature set of two or more candidate sets, of the plurality of candidate sets, to a trained machine learning engine to generate a respective score for each of the two or more candidate sets;
based on the plurality of scores, selecting a particular candidate set of the plurality of candidate sets; and
generating output that indicates the mapping, of candidate values to the set of target keys, that is represented by the particular candidate set;
wherein the method is performed by one or more computing devices;
wherein identifying a plurality of candidate values includes identifying values, within the extracted text, that match any one of a plurality of formats associated with the particular value-type;
wherein the method further comprises, for each format of the plurality of formats, determining whether the format passes a format-pruning test that is based, at least in part, on:
a total number of values within the extracted text that match the format, and
a total number of values within the extracted text that match the format and produce confidence scores above a particular threshold;
wherein the plurality of formats includes at least one format that does not pass the format-pruning test and at least one format that passes the format-pruning test; and
wherein the step of generating a plurality of candidate sets is performed based on only those candidate values that matched a format, of the plurality of formats, that passed the format-pruning test.

4. The method of claim 1 wherein:
the method includes determining which candidate sets, of the plurality of candidate sets, satisfy one or more heuristic rules; and
determining the two or more candidate sets by pruning, from the plurality of candidate sets, those candidate sets that do not satisfy the one or more heuristic rules.

5. The method of claim 4 wherein at least one of the one of more heuristic rules relates to a horizontal feature.

6. The method of claim 1 further comprising selecting, from a plurality of trained machine learning engines, the trained machine learning engine that is used to generate the plurality of scores, wherein each of the plurality of trained machine learning engines uses a different modelling technique.

7. A method comprising:
obtaining extracted text from a document;
identifying a plurality of candidate values, within the extracted text, that correspond to a particular value-type;
generating a plurality of candidate sets based on the plurality of candidate values, wherein each candidate set of the plurality of candidate sets represents a distinct mapping of candidate values, from the plurality of candidate values, to a set of target keys of the particular value-type;
generating a respective feature set for each candidate set of the plurality of candidate sets;
generating a plurality of scores, where each score is for an entire candidate set, by feeding the respective feature set of two or more candidate sets, of the plurality of candidate sets, to a trained machine learning engine to generate a respective score for each of the two or more candidate sets;
based on the plurality of scores, selecting a particular candidate set of the plurality of candidate sets;
generating output that indicates the mapping, of candidate values to the set of target keys, that is represented by the particular candidate set;
wherein the method further comprises selecting, from a plurality of trained machine learning engines, the trained machine learning engine that is used to generate the plurality of scores, wherein each of the plurality of trained machine learning engines uses a different modelling technique; and
wherein the trained machine learning engine is selected based on a composite metric that gives a first weight to an extraction rate metric and gives a second weight to an extraction accuracy metric.

8. The method of claim 6 wherein the plurality of trained machine learning engines includes a first trained machine learning engine that uses a linear regression model and a second trained machine learning engine that uses a non-linear model.

9. The method of claim 6 wherein the plurality of trained machine learning engines includes a first trained machine learning engine that uses a linear regression model and a second trained machine learning engine that uses a neural network.

10. The method of claim 1 wherein the respective feature set for each candidate set includes at least one horizontal feature and at least one vertical feature.

11. One or more non-transitory computer-readable media storing instructions which, when executed by one or more computing devices, cause:
obtaining extracted text from a document;
identifying a plurality of candidate values, within the extracted text, that correspond to a particular value-type;
generating a plurality of candidate sets based on the plurality of candidate values, wherein each candidate set of the plurality of candidate sets represents a distinct mapping of candidate values, from the plurality of candidate values, to a set of two or more target keys of the particular value-type;
generating a respective feature set for each candidate set of the plurality of candidate sets;
generating a plurality of scores, where each score is for an entire candidate set, by feeding the respective feature set of two or more candidate sets, of the plurality of candidate sets, to a trained machine learning engine to generate a respective score for each of the two or more candidate sets;
based on the plurality of scores, selecting a particular candidate set of the plurality of candidate sets; and generating output that indicates the mapping, of candidate values to the set of target keys, that is represented by the particular candidate set.

12. The one or more non-transitory computer-readable media of claim 11 wherein identifying a plurality of candidate values includes identifying values, within the extracted text, that match any one of a plurality of formats associated with the particular value-type.

13. One or more non-transitory computer-readable media storing instructions which, when executed by one or more computing devices, cause:
   obtaining extracted text from a document;
   identifying a plurality of candidate values, within the extracted text, that correspond to a particular value-type;
   generating a plurality of candidate sets based on the plurality of candidate values, wherein each candidate set of the plurality of candidate sets represents a distinct mapping of candidate values, from the plurality of candidate values, to a set of target keys of the particular value-type;
   generating a respective feature set for each candidate set of the plurality of candidate sets;
   generating a plurality of scores, where each score is for an entire candidate set, by feeding the respective feature set of two or more candidate sets, of the plurality of candidate sets, to a trained machine learning engine to generate a respective score for each of the two or more candidate sets;
   based on the plurality of scores, selecting a particular candidate set of the plurality of candidate sets; and
   generating output that indicates the mapping, of candidate values to the set of target keys, that is represented by the particular candidate set;
   wherein identifying a plurality of candidate values includes identifying values, within the extracted text, that match any one of a plurality of formats associated with the particular value-type;
   wherein:
   execution of the instructions further causes, for each format of the plurality of formats, determining whether the format passes a format-pruning test that is based, at least in part, on:
      a total number of values within the extracted text that match the format, and
      a total number of values within the extracted text that match the format and produce confidence scores above a particular threshold;
   the plurality of formats includes at least one format that does not pass the format-pruning test and at least one format that passes the format-pruning test; and
   the step of generating a plurality of candidate sets is performed based on only those candidate values that matched a format, of the plurality of formats, that passed the format-pruning test.

14. The one or more non-transitory computer-readable media of claim 11 wherein execution of the instructions further causes:
   determining which candidate sets, of the plurality of candidate sets, satisfy one or more heuristic rules; and
   determining the two or more candidate sets by pruning, from the plurality of candidate sets, those candidate sets that do not satisfy the one or more heuristic rules.

15. The one or more non-transitory computer-readable media of claim 14 wherein at least one of the one of more heuristic rules relates to a horizontal feature.

16. The one or more non-transitory computer-readable media of claim 11 wherein execution of the instructions further causes selecting, from a plurality of trained machine learning engines, the trained machine learning engine that is used to generate the plurality of scores, wherein each of the plurality of trained machine learning engines uses a different modelling technique.

17. One or more non-transitory computer-readable media storing instructions which, when executed by one or more computing devices, cause:
   obtaining extracted text from a document;
   identifying a plurality of candidate values, within the extracted text, that correspond to a particular value-type;
   generating a plurality of candidate sets based on the plurality of candidate values, wherein each candidate set of the plurality of candidate sets represents a distinct mapping of candidate values, from the plurality of candidate values, to a set of target keys of the particular value-type;
   generating a respective feature set for each candidate set of the plurality of candidate sets;
   generating a plurality of scores, where each score is for an entire candidate set, by feeding the respective feature set of two or more candidate sets, of the plurality of candidate sets, to a trained machine learning engine to generate a respective score for each of the two or more candidate sets;
   based on the plurality of scores, selecting a particular candidate set of the plurality of candidate sets;
   generating output that indicates the mapping, of candidate values to the set of target keys, that is represented by the particular candidate set;
   wherein the method further comprises selecting, from a plurality of trained machine learning engines, the trained machine learning engine that is used to generate the plurality of scores, wherein each of the plurality of trained machine learning engines uses a different modelling technique; and
   wherein the trained machine learning engine is selected based on a composite metric that gives a first weight to an extraction rate metric and gives a second weight to an extraction accuracy metric.

18. The one or more non-transitory computer-readable media of claim 16 wherein the plurality of trained machine learning engines includes a first trained machine learning engine that uses a linear regression model and a second trained machine learning engine that uses a non-linear model.

19. The one or more non-transitory computer-readable media of claim 16 wherein the plurality of trained machine learning engines includes a first trained machine learning engine that uses a linear regression model and a second trained machine learning engine that uses a neural network.

20. The one or more non-transitory computer-readable media of claim 11 wherein the respective feature set for each candidate set includes at least one horizontal feature and at least one vertical feature.

* * * * *